(Model.) 4 Sheets—Sheet 4.
G. G. FRELINGHUYSEN.
Hay Gatherer.
No. 231,959. Patented Sept. 7, 1880.
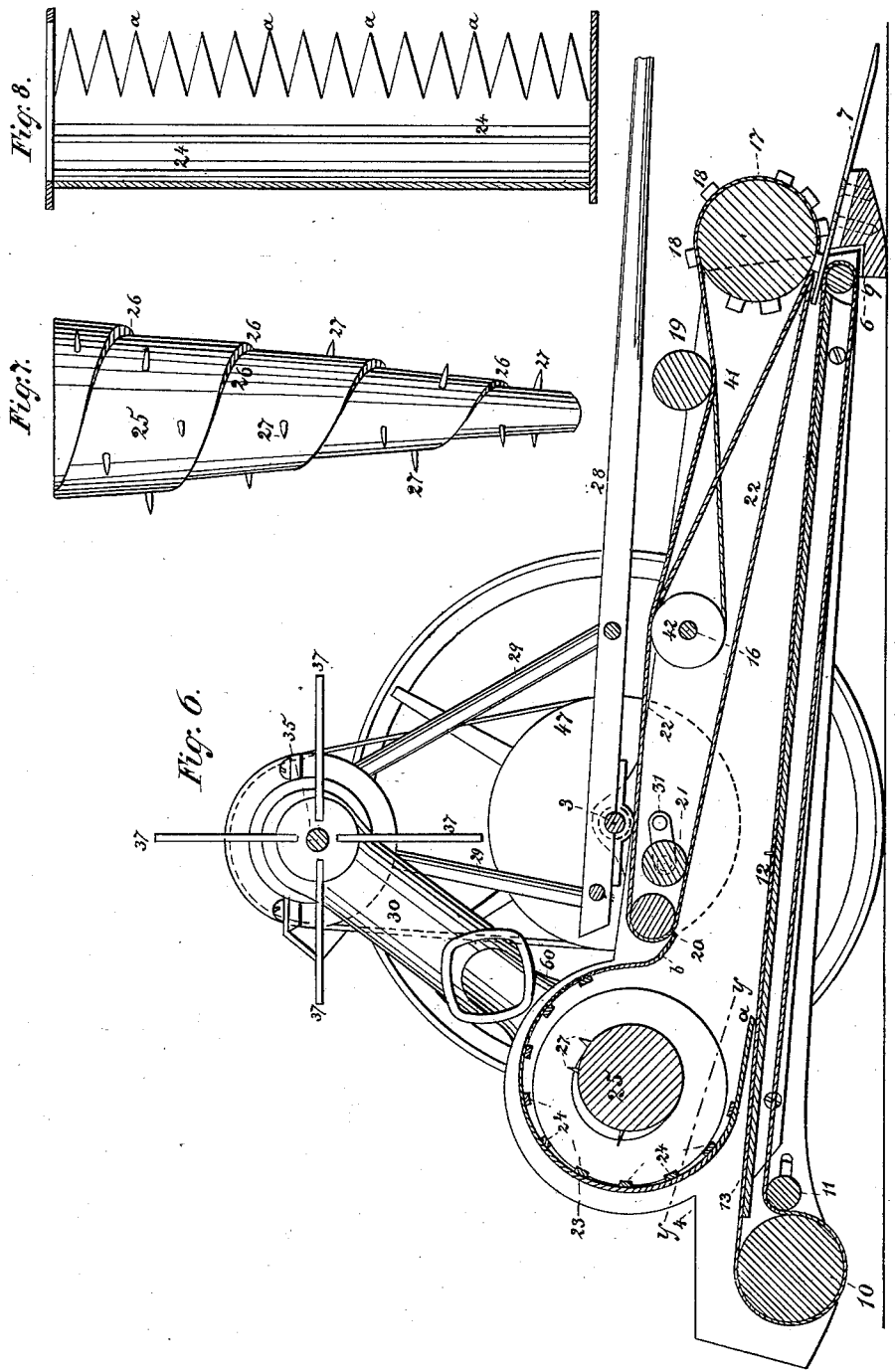
WITNESSES:
Joseph J. Sullivan.
Arthur W. Dunkell.
INVENTOR:
G. G. Frelinghuysen

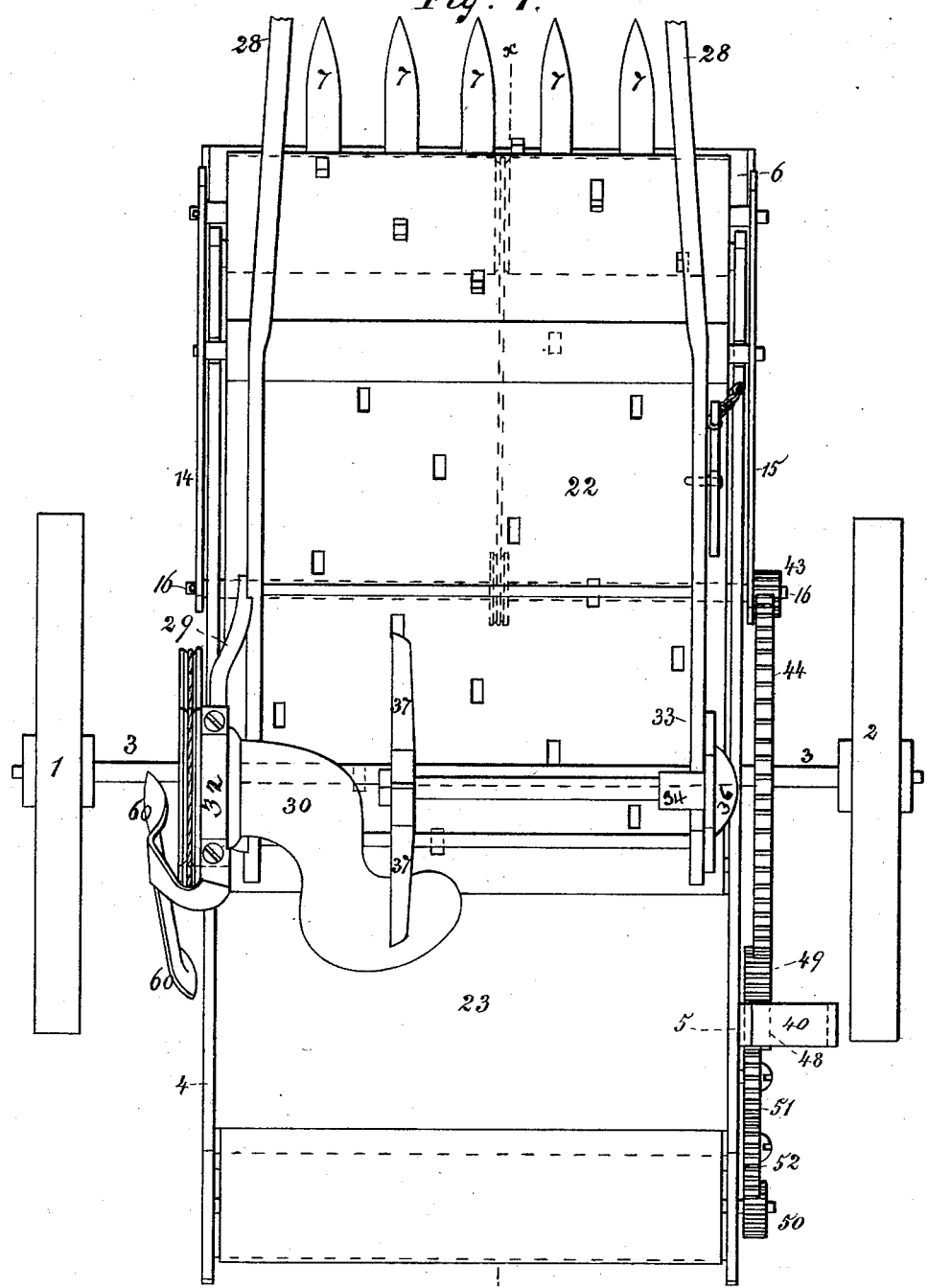

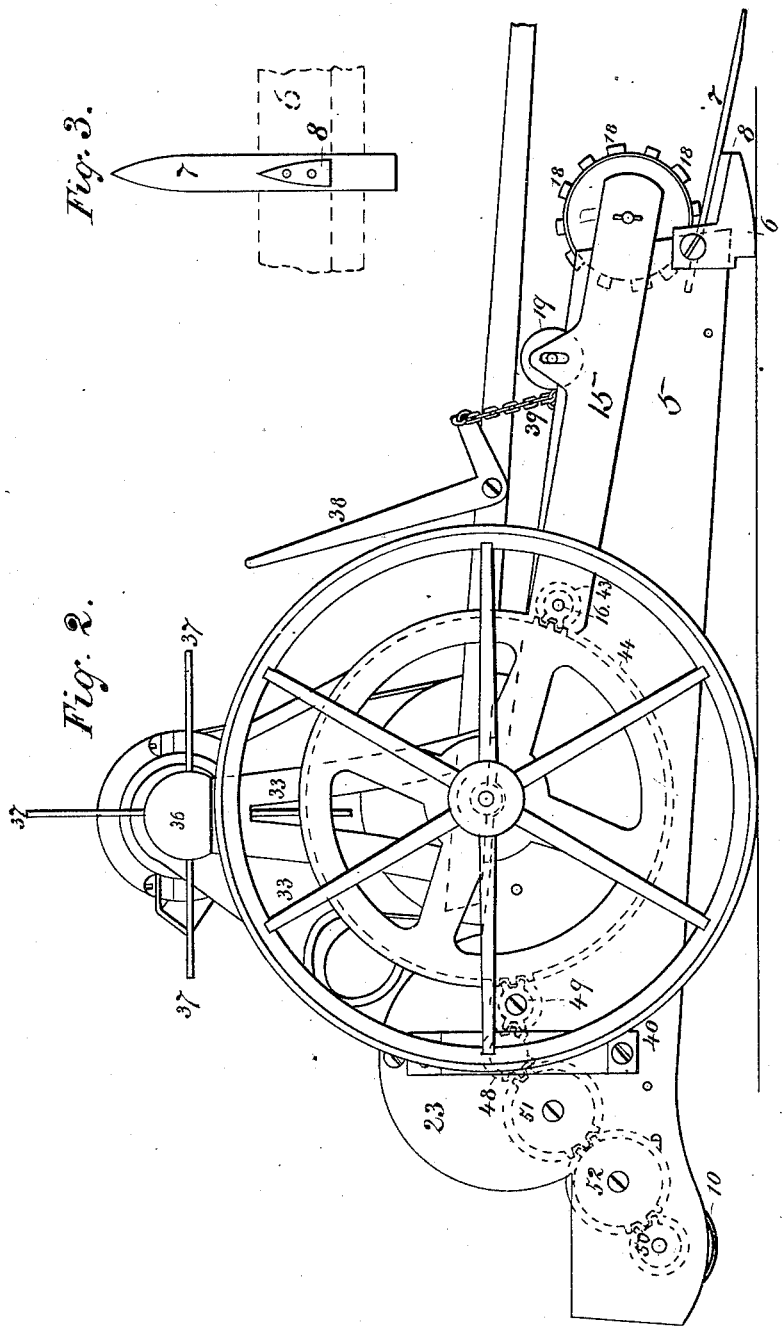

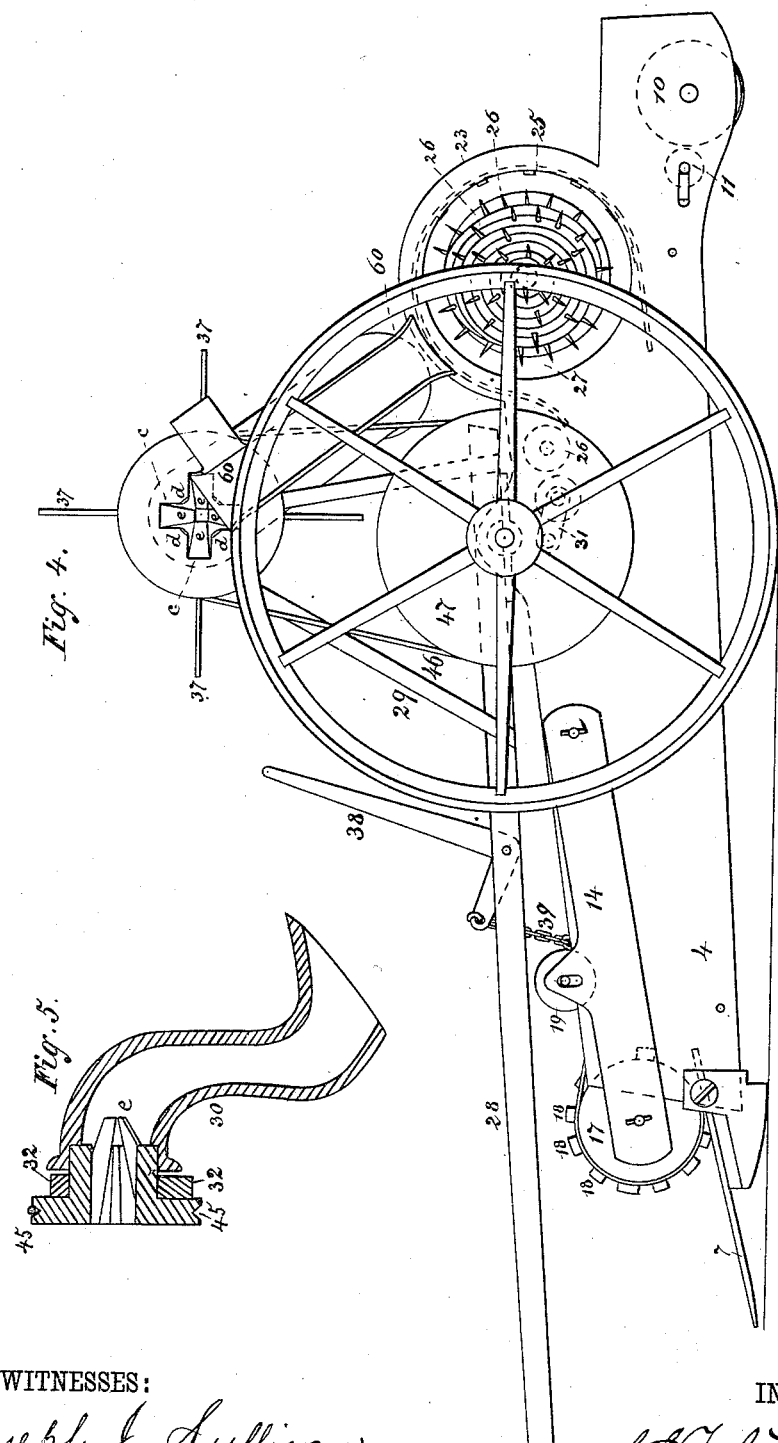

United States Patent Office.

GEORGE G. FRELINGHUYSEN, OF NEWARK, NEW JERSEY.

HAY-GATHERER.

SPECIFICATION forming part of Letters Patent No. 231,959, dated September 7, 1880.

Application filed June 18, 1880. (Model.)

*To all whom it may concern:*

Be it known that I, GEORGE G. FRELINGHUYSEN, of Newark, in the county of Essex and State of New Jersey, have invented a new and useful Improvement in Hay-Gatherers, (Case B,) of which the following is such full, clear, and exact description as will enable others skilled in the art to which it most nearly appertains to make and use the same when taken in connection with the accompanying drawings, in which—

Figure 1 is a top view of my gatherer. Fig. 2 is a side view, showing the gearing. Fig. 3 is a detail drawing of the tooth and block by which it is fastened to the cross-bar. Fig. 4 is a side view, showing the open end of cylinder and cone twister within. Fig. 5 is a section through the center of the winding-sleeve and through journal-box in which it turns. Fig. 6 is a longitudinal section on the line $x\ x$ of Fig. 1. Fig. 7 is an elevation of the cone twister. Fig. 8 is a section of the cylinder as cut by the line $y\ y$, showing the projections on the edge and the strips on the interior of the cylinder.

The nature of my invention consists in the means of collecting hay or grass from a field, twisting it into a rope-like form, winding the thus-formed rope on a reel, and the machine and combinations by which this is accomplished.

The machine shown in the drawings is designed to be drawn by a horse, and is constructed as follows:

The main wheels of the machine, 1 and 2, are joined at their centers by the axle 3, to the ends of which they are rigidly attached. The main frame of the machine, 4 and 5, is fastened to the axle by journal-boxes on the frame surrounding, and in which the axle is free to turn. The side frames, 4 and 5, are firmly attached to one another by appropriate cross-pieces. At the forward end of the frame is the cross-bar 6, of such a shape on its lower side as to readily slide on the ground over which it passes, and on its upper side as to hold the teeth 7 7, &c., at such an angle to the ground that their forward ends will pass along the ground under the hay thereon. The teeth 7 7, &c., are each of the form shown in Fig. 3, in which the block 8, which supports the tooth 7 on the bar 6, is shown. This block is narrower than the tooth it supports, and is attached to the bar by screws passing through the tooth and block and into the bar, or by other appropriate means.

The rollers 9, 10, and 11 are journaled in the side frames 4 and 5, one end of each roller being journaled in each frame. The platform 13 is attached to the side frames, 4 and 5. The endless apron 12 passes over the platform 13 and about the rollers 9 and 10, being pressed against the roller 10 by the roller 11, which is pressed against it by the spring journal-boxes, in which it is held in the frames 4 and 5. The roller 9 is under the rear end of the teeth 7 7, &c., so that the apron 12, in passing about that roller, passes under the rear extension of the teeth, as shown in Fig. 6. The teeth may be cut off close by the apron and roller 9, if desired.

The swinging arms 14 and 15 are respectively fastened to the side frames, 4 and 5, being pivoted on the shaft 16 and free to turn about it. These arms have the roller 17 journaled in them at their forward ends, being free to rise and fall. The roller 17 is driven by the belt 41, which passes around a pulley or groove in the roller and the pulley 42 on the shaft 16, to which is fastened the gear-wheel 43, which takes in the main gear 44 on the shaft 3 of the machine, the belt 41 being crossed, so that the direction of motion of the roller 17 and apron 22 may be in the right direction.

The roller 17 has on its surface the teeth 18 18, which are so arranged that some come directly over the teeth 7 7 and others come between teeth 7 7 in the revolution of the roller. Near the middle of the length of the arms 14 and 15, journaled in them in sliding boxes, is the weighted roller 19, bearing on the apron 22.

The roller 20 is journaled in the frames 4 and 5, near the cylinder 23, hereinafter described. A short way in front of the roller 20 is the weighted roller 21, journaled in swinging arms 31 31 pivoted to the side frames, 4 and 5.

The apron 22 passes about the rollers 17, 20, and 21 and under the roller 19, which endless apron 22 has in it holes at regular distances for the teeth 18 18 on the roller 17 to pass through. This apron should be in length a multiple of the circumference of the roller 17, so that the teeth 18 may correspond with and pass through the holes provided for them at each complete circuit of the belt.

The cylinder 23 is fastened at one end to the side frame, 4, and at the other end to the side frame, 5. Near the rear end of the side frames the side frame, 4, is cut away to correspond with the interior of the cylinder and give it one open end.

The side of the cylinder is cut away for about one-third of its circumference through its whole length, and has on the lower edge teeth *a a*, &c., projecting from it over the apron 12, which passes underneath. The other edge of the cylinder has a projecting part, *b*, which is very close to the apron 22 as it passes around the roller 20. (See Fig. 6.) The interior of the cylinder is lined with strips 24, arranged longitudinally on the surface a slight distance from one another, so as to form grooves between them.

The cone twister 25 is journaled in the side frame, 5, bearing against the bridge 40, thereto attached, so that the axis of the cone twister and the axis of the cylinder nearly correspond; or the cone twister may be so placed that its axis is nearer the lower edge of the cylinder on which the teeth *a* are attached, and slightly away from the center of the cylinder.

The cone twister 25 has about it a spiral step, 26, from the smaller end to the base. The form of the cone is such that the spiral step is topped or capped by a surface sloping up away from the line of the axis of the cone to the bottom of the next step, so that there is in all parts of the surface of the cone a gradual slope toward the apex, as well as the abrupt step which winds spirally around. On the surface of this cone twister are spring-teeth 27, arranged so that their outward points incline slightly in the direction of the smaller end of the cone and slightly about the cone, as shown in Fig. 7.

The cone twister is driven by the gear-wheel 48 on the shaft by which it is journaled in the side frame, 5, which gear-wheel 48 receives its motion through the idler 49 from the main gear-wheel 44 on the axle 3.

Motion is given the apron 12 by the roller 10, driven by the gear-wheel 50 on the shaft of roller 10, which gets its motion from the gear-wheel 48 through the idlers 51 and 52.

To the axle 3, by means of journal-boxes thereon, are attached the shafts 28, by which the machine may be drawn, on which shafts is made a frame, to which there are attached frames 29 and 33, one on either side of the machine.

The frame 29 has attached to its upper part a journal-box, 32, in which the revolving sleeve and winder 30 is held and turns. The revolving sleeve and winder consists of a tube bent nearly to an S shape, as shown at Fig. 5, at or near one end of which is arranged a pulley, 45, attached to the revolving sleeve, on which latter is a bearing for the journal-box 32.

Within the tube, and at or near its end, are the grooves *c c* between the projections *d d*, and within these grooves are fastened springs *e e*, one end of each spring being fastened to the bottom of a groove in such manner that the ends of the springs farther in the tube will approach the center of the tube and one another, projecting above the projections *d d*, between which they are fastened, and adapting the tube or revolving sleeve to any size rope passing through it.

The opposite frame 33 on the frame on the shafts has on it the journal-box 34 for the reel-axle 35, which axle 35 is arranged in the journal-box 34, being free to turn therein. On one end of the axle 35 is the fixed head 36, to prevent its passing entirely through the journal-box 34, and on the other end the arms 37 are removably attached by a nut or pin.

The guide 60 is attached to the frame 29 near the journal-box 32, so that one end of the guide is near the end of the cylinder 23 and the other end of the guide is near the revolving sleeve and winder 30. The guide consists of a piece of metal having a concave face and each end bent back from the face toward the cylinder at one end and the revolving sleeve at the other.

The lever 38 on the shaft connected with the side frame by the chain 39 is provided to adjust the position of the side frames and parts attached thereto in relation to the shafts.

The operation of the machine is as follows: The machine is drawn forward by a horse between the shafts 28. The lever 38 is released, so that the front of the frame is lowered and the under side of the front cross-bar, 6, or the shoes thereon, rest on the ground. The revolution of the wheels and axle 1, 2, and 3 cause, the faces nearest one another of the aprons 12 and 22 to move backward away from the teeth 7 7. The lower apron, 12, passes under the cylinder 23 in close proximity to the teeth *a* on the edge thereof. The roller 17 and the apron 22 move in such direction that their lower surfaces move in the same direction as the upper surface of the lower apron, 12, the cone twister 25 being revolved in such direction that its lower side will move in the same direction as the apron 12 underneath it. The revolving sleeve and winder is driven by the belt 46 in the same direction as the main axle 3.

The teeth 7 7 of the machine pass under and raise upon them the hay or grain with which they come in contact, which is carried back by the teeth 18 18 and apron 22 on the roller 17 to the apron 12, and is pressed between these aprons 12 and 22, (the roller 17 rising in the swinging arms 14 and 15 and the roller 21 swinging in its arms 31 31, so that the position of the apron 22 will accommodate itself to the amount of hay on the teeth 7 and apron 12,) and carried back to the cylinder 23, into which it enters through the slit cut in the cylinder for that purpose. Being raised from the apron 12 by the teeth *a*, it is carried by the revolutions of the cone twister around the inside of the cylinder, and as the cone twister slips in the encircling mass it (the hay) is pushed to a smaller portion of the cone by the edge of the spiral step on the cone, and so out the open end of the cylinder. The hay as it comes from the cylinder is partially twisted into a rope-like form, and this partially twisted hay is passed over the guide 60, and the end of the rope fed by the hand of the attendant into the sleeve and passed through the sleeve and winder, and from the other end of the winder led by the hand of the attendant to the reel-axle 35 and twisted about it so that the end will be held to the reel. The reel is free to turn on its axle. Another revolution of the winder carrying the twisted hay about it will cause the reel to revolve, and the drag of the reel will be sufficient to draw the rope through the sleeve and winder. The reel may be provided with a brake, so that the amount of drag on the rope may be regulated by the attendant.

The rope from the cone twister and cylinder to the revolving sleeve is twisted at the one end in one direction and at the other end in the reverse direction, the cone twister turning one end and the revolving sleeve and winder turning the other end, which end is fast on the reel and turns with the winder, thus continually increasing the twist in the rope between the cone twister and revolving sleeve, as they each twist against one another in their twisting operation on the rope between them.

The revolution of the cone twister and of the revolving sleeve is, in the drawings, shown as being in the same direction; but the rope is reversed on itself, which makes the cone twister and the revolving sleeve bear the same relation to the rope as if one turned in a direction of revolution the reverse of the other and the rope was kept straight between them.

The hay or grain thus wound on the reel may be removed by taking off the removable arms 37 and drawing out the axle 35, leaving the roll of rope-like hay to be removed from the field as may be most convenient. The axle and arms, being put again in position, are ready to receive another roll.

The rake described in an application marked "A," made by me about this time, may be used in place of the frame-aprons, cylinder, and twister herein described to give the first twist to the hay, in connection with the revolving sleeve, winder, and reel, or I may use the latter with the mower attachment described in an application marked "C," made by me about this time.

I do not claim in this application the combination of rake-teeth and cylinder having within it a cone twister and operating mechanism; nor the main frame-axle and wheels combined with a rake-frame, rake-teeth, cylinder, and revolving cone twister, and operating mechanism, as they are claimed in an application for patent for improvement in rakes made by me about this time. Nor do I claim the combination of the platform, apron, apron-operating mechanism, and conical tube, a segment of which is cut away, having on one edge teeth projecting over and close to the apron; nor the combination of the platform, apron, tube, twister, and operating mechanism; nor the combination of a platform, apron, tube, twister, revolving sleeve, and operating mechanism, as they are embraced and claimed in an application for patent for improvement in twisting attachment for mowing-machine made by me about this time.

What I claim as new, and desire to secure by Letters Patent, is—

1. The combination of a cylinder having a portion thereof cut away, an apron moving under and in combination with the same, and operating mechanism, substantially as specified.

2. The teeth of a rake combined with a cross-bar, and fastened thereon by blocks narrower than the teeth set between the cross-bar and each tooth, as specified and set forth.

3. The toothed roller journaled in swinging arms with operating mechanism and an endless apron encircling it, a fixed roller, and a weighted roller held in swinging arms, all combined with a weighted roller resting on the upper surface of the apron, as specified and set forth.

4. The rake-teeth combined with an endless apron and operating mechanism, the apron passing under and in contact with a cylinder from which a portion of the shell has been removed, as specified and set forth.

5. The rake-teeth combined with an endless apron passing under and in contact with a cylinder, as specified, in combination with a roller having teeth on its surface and an endless apron encircling it, the toothed roller and encircling apron being free to move toward and away from the face of the rake-teeth and operating mechanism, as specified and set forth.

6. The cylinder partially cut away through its whole length, having the projections $a\ a$ on one edge and longitudinal strips on the inner surface, as specified and set forth.

7. The cone twister having about it a spiral step from at or near the base to or near the apex, and spring-teeth on the surface, as specified.

8. The cylinder, in combination with a cone twister having about it a spiral step, and spring-teeth and operating mechanism, substantially as specified and set forth.

9. The cylinder, endless apron, cone twister, and operating mechanism, combined substantially as specified and set forth.

10. The rake-teeth combined with an endless apron passing under a cylinder, having a cone twister within, and operating mechanism, all in combination with a roller having teeth on its surface and an endless apron encircling it free to move toward and away from the face of the rake-teeth, and operating mechanism, as specified and set forth.

11. The revolving sleeve having within it projections, and springs between the projections and a winding arm, and operating mechanism, as specified and set forth.

12. The revolving sleeve and winder and operating mechanism, in combination with the reel, as specified and set forth.

13. The revolving sleeve and winder and reel, combined with the gathering and twisting mechanism and operating mechanism, so combined that the material operated upon is twisted in reverse directions by the twister and sleeve, as specified and set forth.

G. G. FRELINGHUYSEN.

Witnesses:
PERRY BELMONT,
ARTHUR DUDLEY VINTON.